United States Patent
Mueller et al.

(10) Patent No.: US 8,303,039 B2
(45) Date of Patent: Nov. 6, 2012

(54) SEAT ASSEMBLY HAVING A MOVABLE HEAD RESTRAINT

(75) Inventors: Karsten Mueller, Ingolstadt (DE); Michael Menges, Pliening (DE); Achim Tscherbner, Ingolstadt (DE); Erich Urban, Freising-Sunzhausen (DE)

(73) Assignee: Lear Corporation, Southfield, MI (US)

( * ) Notice: Subject to any disclaimer, the term of this patent is extended or adjusted under 35 U.S.C. 154(b) by 204 days.

(21) Appl. No.: 12/764,142

(22) Filed: Apr. 21, 2010

(65) Prior Publication Data

US 2010/0270842 A1    Oct. 28, 2010

Related U.S. Application Data

(60) Provisional application No. 61/171,568, filed on Apr. 22, 2009, provisional application No. 61/300,228, filed on Feb. 1, 2010.

(30) Foreign Application Priority Data

Mar. 22, 2010 (DE) .......................... 10 2010 003 109

(51) Int. Cl.
   *A47C 7/36* (2006.01)
(52) U.S. Cl. ........................................ 297/410; 297/391
(58) Field of Classification Search .................. 297/391, 297/410
   See application file for complete search history.

(56) References Cited

U.S. PATENT DOCUMENTS

| | | | |
|---|---|---|---|
| 3,563,602 A | 2/1971 | Ohta et al. | |
| 4,191,422 A * | 3/1980 | Inasawa et al. | 297/391 |
| 4,265,482 A * | 5/1981 | Nishimura et al. | 297/391 |
| 4,278,291 A * | 7/1981 | Asai | 297/391 |
| 4,657,304 A * | 4/1987 | Heesch et al. | 297/391 |
| 4,674,797 A | 6/1987 | Tateyama | |
| 5,445,434 A | 8/1995 | Kohut | |
| 6,082,817 A | 7/2000 | Muller | |
| 6,364,415 B1 | 4/2002 | Mori et al. | |
| 6,390,558 B2 | 5/2002 | Fischer et al. | |
| 6,688,697 B2 | 2/2004 | Baumann et al. | |
| 6,715,829 B2 | 4/2004 | Svantesson et al. | |
| 6,805,411 B2 | 10/2004 | Gramss et al. | |
| 6,899,395 B2 | 5/2005 | Yetukuri et al. | |
| 6,983,995 B1 * | 1/2006 | Veine et al. | 297/391 |
| 7,048,336 B2 | 5/2006 | Mawbey et al. | |
| 7,070,235 B2 | 7/2006 | Schilling et al. | |

(Continued)

FOREIGN PATENT DOCUMENTS

DE    19603911 A1    8/1997

(Continued)

*Primary Examiner* — Milton Nelson, Jr.
(74) *Attorney, Agent, or Firm* — Brooks Kushman P.C.

(57) ABSTRACT

An adjustable head restraint assembly is provided with a support rod adapted to be mounted proximate to a vehicle seat back. A primary frame is supported on the support rod. A secondary frame is mounted to the primary frame for translation in a fore and aft direction. A locking arm is pivotally connected to one of the frames for engagement with a series of notches formed in the other. A biasing member cooperates with a locking arm for biasing the locking arm into a locked position. An actuator pivots the locking arm out of engagement from the series of notches for unlocking the locking arm and permitting adjustment of the adjustable head restraint in the fore and aft direction. The primary frame translates along the support rod with a locking arm for engagement with notches in the support rod for movement by the actuator for adjustment in an upright direction.

20 Claims, 14 Drawing Sheets

U.S. PATENT DOCUMENTS

| | | |
|---|---|---|
| 7,073,863 B1 * | 7/2006 | Low et al. .................. 297/404 |
| 7,111,901 B2 | 9/2006 | Schlierf et al. |
| 7,137,668 B2 | 11/2006 | Kreitler |
| 7,144,083 B2 | 12/2006 | List et al. |
| 7,195,313 B2 | 3/2007 | Hippel et al. |
| 7,232,187 B1 | 6/2007 | Sundararajan et al. |
| 7,284,793 B2 * | 10/2007 | Klühspies et al. ....... 297/216.12 |
| 7,316,455 B2 | 1/2008 | Metz et al. |
| 7,676,064 B2 | 3/2010 | Neff et al. |
| 7,758,127 B2 | 7/2010 | Bokelmann et al. |
| 2001/0028191 A1 | 10/2001 | Lance |
| 2001/0040396 A1 | 11/2001 | Kreuels et al. |
| 2004/0195894 A1 | 10/2004 | Pal et al. |
| 2005/0077762 A1 | 4/2005 | Kraemer et al. |
| 2005/0146190 A1 | 7/2005 | Taatjes |
| 2006/0071518 A1 | 4/2006 | Hippel et al. |
| 2006/0226688 A1 | 10/2006 | Terada et al. |
| 2006/0250017 A1 * | 11/2006 | Otto et al. .................. 297/410 |
| 2007/0216211 A1 | 9/2007 | Mori |
| 2008/0001456 A1 | 1/2008 | Muller et al. |
| 2009/0058162 A1 | 3/2009 | Boes et al. |
| 2009/0058163 A1 | 3/2009 | Bokelmann et al. |
| 2009/0146479 A1 * | 6/2009 | Boes et al. .................. 297/391 |
| 2009/0184556 A1 | 7/2009 | Bokelmann et al. |
| 2010/0270841 A1 * | 10/2010 | Sobieski et al. ............. 297/391 |

FOREIGN PATENT DOCUMENTS

| | | |
|---|---|---|
| DE | 19714283 A1 | 11/1997 |
| DE | 19632560 A1 | 2/1998 |
| DE | 19737706 C1 | 1/1999 |
| DE | 10035972 A1 | 2/2001 |
| DE | 10043923 A1 | 4/2002 |
| DE | 102004005695 A1 | 8/2004 |
| DE | 10312517 A1 | 10/2004 |
| DE | 102004030933 B3 | 8/2005 |
| DE | 102004055986 A1 | 6/2006 |
| DE | 102005020276 B3 | 9/2006 |
| DE | 102006015785 A1 | 10/2006 |
| DE | 102008060641 A1 | 6/2009 |
| EP | 1717099 A2 | 11/2006 |
| FR | 2852066 A1 | 9/2004 |
| GB | 2302706 A | 1/1997 |
| GB | 2340744 A | 3/2000 |
| GB | 2418850 A | 4/2006 |
| WO | 2004089688 A1 | 10/2004 |
| WO | 2007073034 A1 | 6/2007 |

* cited by examiner

SEAT ASSEMBLY HAVING A MOVABLE HEAD RESTRAINT

CROSS-REFERENCE TO RELATED APPLICATIONS

This application claims the benefit of U.S. provisional application Ser. No. 61/171,568, filed Apr. 22, 2009, and U.S. provisional application Ser. No. 61/300,228, filed Feb. 1, 2010. This application also claims foreign priority benefits under 35 U.S.C. §119(a)-(d) to DE 10 2010 003 109.7, filed Mar. 22, 2010, the disclosures of which are hereby incorporated by reference in their entirety.

BACKGROUND

1. Technical Field

Various embodiments relate to a vehicle seat assembly having a movable head restraint.

2. Background Art

Movable head restraints permit adjustment of a head restraint relative to the seat assembly. One such example is disclosed in U.S. Pat. No. 7,073,863 B1 to Low et al.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figure 1:
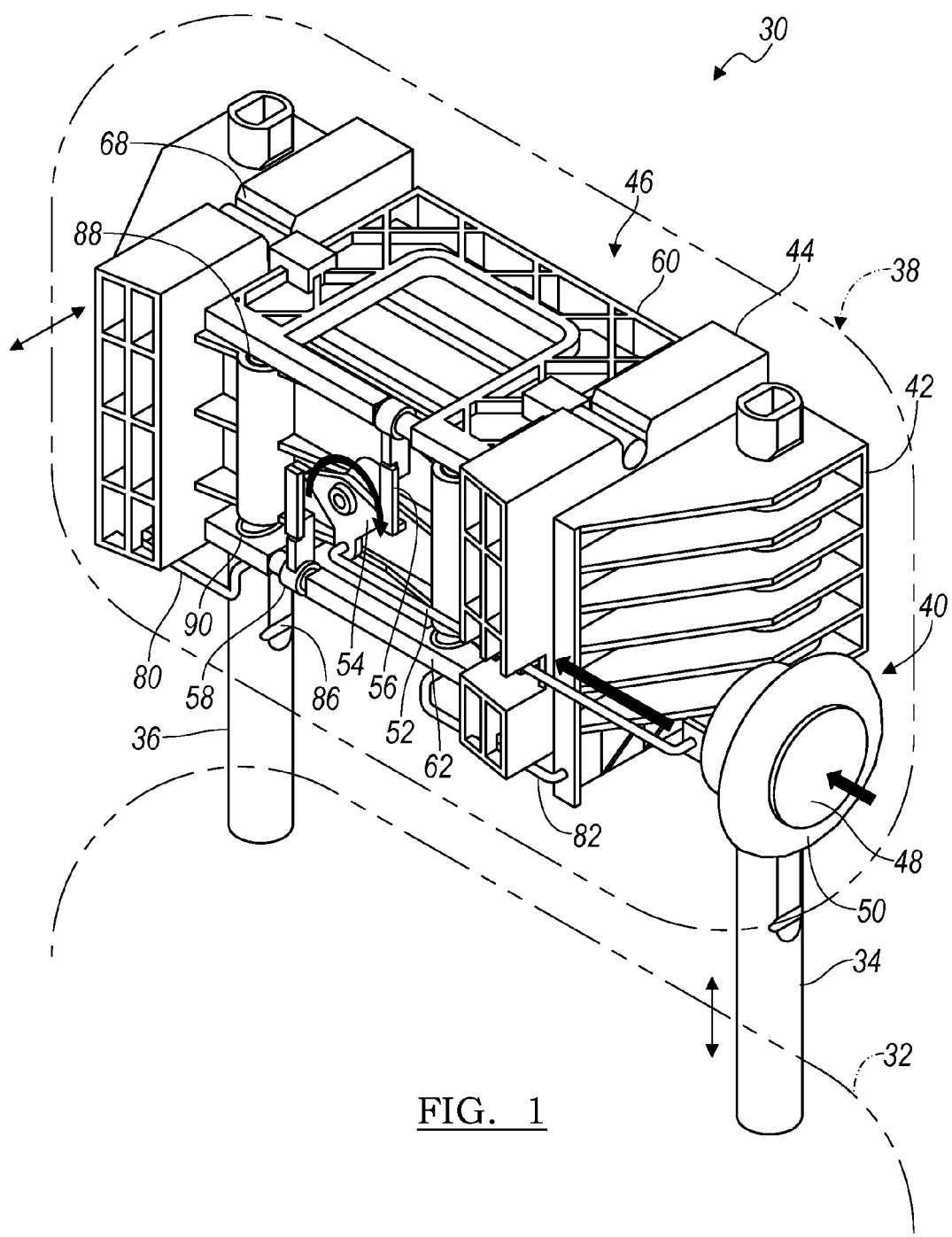
FIGS. 1 and 2 are fragmentary perspective views of a portion of a first embodiment of a moveable head restraint in a locked condition.

Referring to FIG. 1, a portion of a movable head restraint assembly is illustrated and referenced by numeral 30. The head restraint assembly 30 may be provided with a seat assembly, such as a seat back 32. The seat assembly may be a seat for a vehicle, such as a vehicle like a car or truck.

The movable head restraint assembly 30 may include a support post, or a pair of support posts 34, 36 as depicted, and a headrest 38.

The support posts 34, 36 may extend from the seat back 32 of the vehicle seat. The support posts 34, 36 may be fixedly or movably disposed on the seat back 32 in various embodiments. The support posts 34, 36 may be disposed in a guide sleeve that is disposed on the seat back 32. The support posts 34, 36 may have any suitable configuration. For example, one or more support posts 34, 36 may extend between the seat back 32 and the headrest 38. Moreover, the support posts 34, 36 may be formed integrally as one support post that is generally U-shaped. The support posts 34, 36 may be made of any suitable material or materials, such as a metal or metal alloy. Although the support posts 34, 36 are illustrated extending from the seat back 32, the invention contemplates that the support posts 34, 36 may be mounted anywhere to the vehicle body for supporting the headrest 38 proximate to the seat back 32.

The headrest 38 may include a trim cover, a cushion, and a positioning apparatus 40. The headrest 38 may be configured to support the head of a seat occupant and move in one or more directions with respect to the support posts 34, 36.

The trim cover may provide at least a portion of the exterior of the headrest 38. The trim cover may be made of any suitable material or materials, such as vinyl, leather, fabric, or combinations thereof.

The cushion may be disposed proximate and may be concealed by the trim cover. The cushion may be made of any suitable material or materials. For example, the cushion may be an opened or closed cell foam.

The positioning apparatus 40 may facilitate movement of the headrest 38. The positioning apparatus 40 may include a traverse member 42, a slide member 44, and a latching subsystem 46.

The traverse member 42 may be disposed on the support posts 34, 36. In at least one embodiment, the traverse member 42 may receive the support posts 34, 36 and may be configured to move with respect to the support posts 34, 36 in a first manner and/or first direction. For example, the first direction may generally be toward or away from the seat back 32 and may or may not be linear. The traverse member 42 may extend between multiple support posts 34, 36 or upright portions of a support post 34, 36 that extend from the seat back 32. The traverse member 42 may be made of any suitable material, such as a polymeric material. The traverse member 42 provides a primary frame for the head restraint assembly 30. Additionally, for the depicted embodiment of FIG. 1, the traverse member 42 cooperates with the support posts 34, 36 to translate linearly along the support posts 34, 36.

The slide member 44 may be movably disposed on the traverse member 42. The slide member 44 may generally move in a second manner and/or second direction. For example, the slide member 44 may generally move toward or away from the support posts 34, 36 and may or may not be linear. The slide member 44 may be made of any suitable material, such as a polymeric material and may provide a secondary frame for the headrest 38. In the depicted embodiment of FIG. 1, the slide member 44 moves in a fore and aft direction of the seat relative to the traverse member 42.

A shell (not shown) may be provided within the headrest 38 for enclosing the traverse member 42, slide member 44 and latching subsystem 46. The shell may be mounted directly to the slide member 44 and may support the cushion and trim cover. Thus, movement of the traverse member 42 along the support posts 34, 36 results in movement of the slide member 44 and consequently, the shell, the cushion and the trim cover. Likewise, movement of the slide member 44 relative to the traverse member 42 results in movement of the slide member 44, the shell, the cushion, and the trim cover.

The latching subsystem 46 may be associated with the headrest 38. The latching subsystem 46 may include a button 48. The button 48 may be disposed on the headrest 38 and may or may not be covered by the trim cover. The button 48 may be movably disposed in a sleeve 50 that may include a bezel. The sleeve 50 may be mounted to the shell, or directly to the slide member 44.

A link 52 may be actuated by movement of the button 48. The link 52 may be configured as a metal wire in at least one embodiment. The link 52 may actuate or may be coupled to an armature 54.

The armature 54 may be movably disposed on the slide member 44. In at least one embodiment, such as the embodiment depicted, the armature 54 may rotate about an axis of rotation. The link 52 is pivotally connected to the armature 54 radially offset from the axis of rotation so that movement of the link 52 rotates the armature 54. The armature 54 may include one or more output links or secondary links 56, 58 that each actuate and/or engage a locking plate 60, 62.

Figure 2:
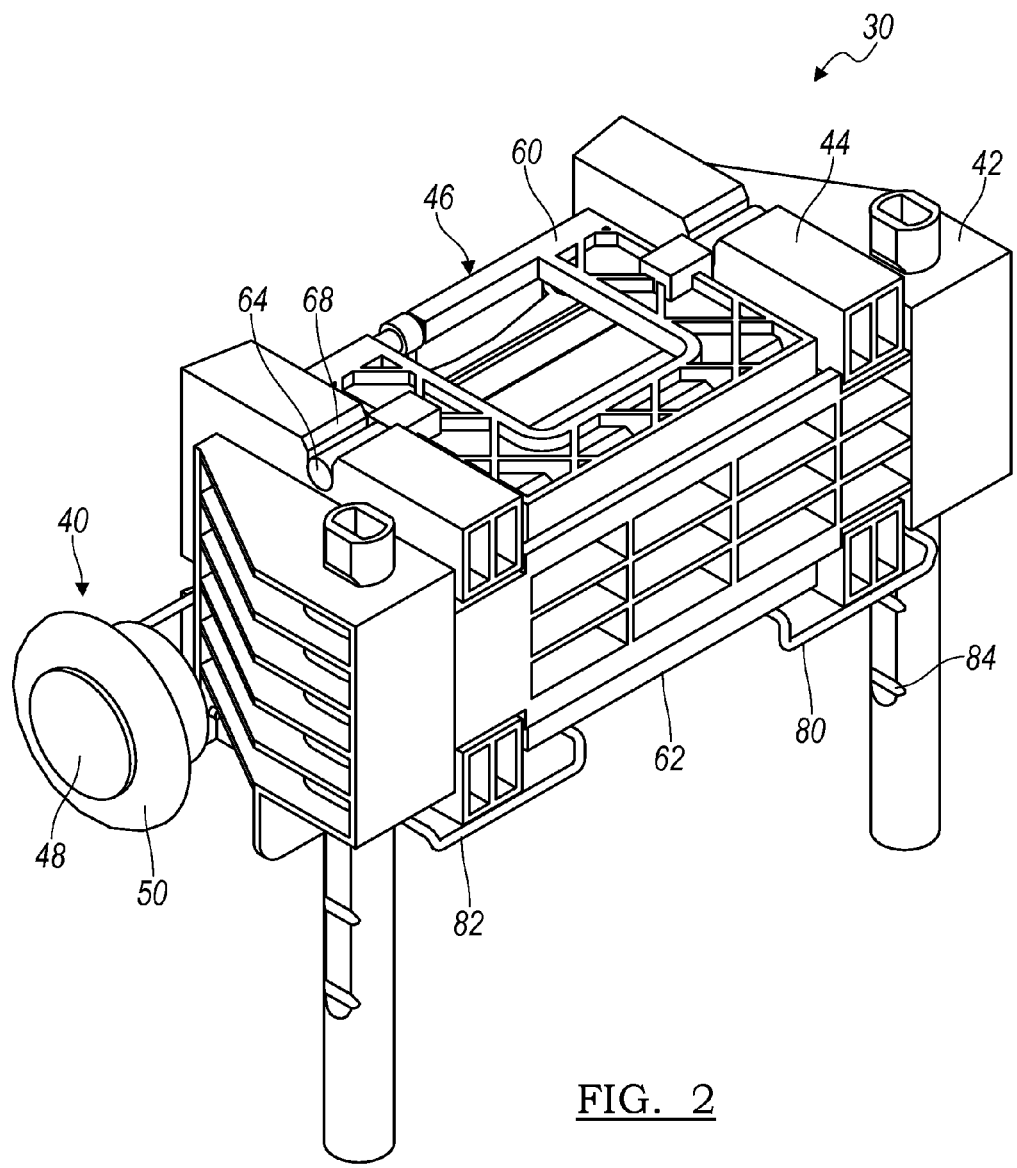
Figure 3:
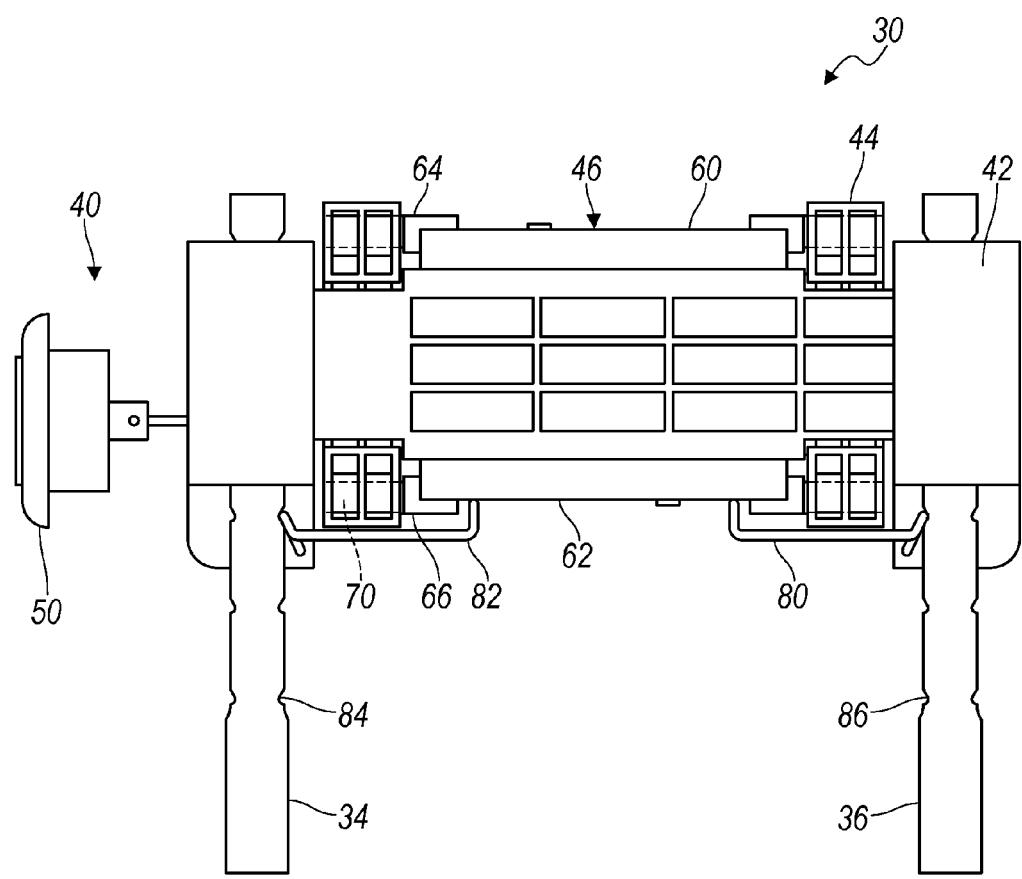
FIG. 3 is a back side view of the moveable head restraint shown in FIG. 1.
Figure 9:
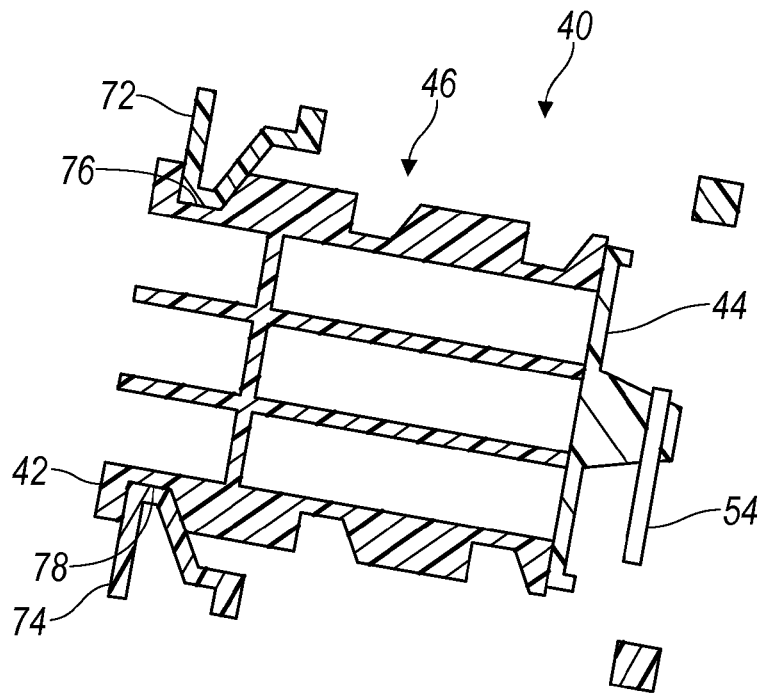
FIG. 9 is a fragmentary section view illustrating a locking element in an engaged position.
Figure 10:
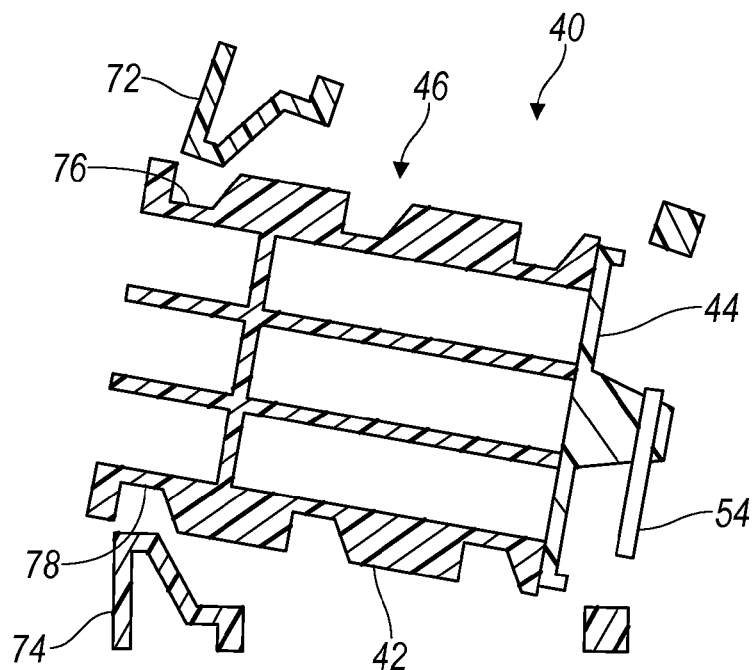
FIG. 10 is a fragmentary section view illustrating a locking element in a disengaged position.

One or more locking plates 60, 62 may be movably disposed on the slide member 44. The locking plates 60, 62 may be pivotally disposed on the slide member 44 in at least one embodiment. For example, the locking plates 60, 62 may pivot about one or more pins 64, 66, which are illustrated in FIGS. 2 and 3. The pins 64, 66 are each disposed in slots 68, 70 in the slide member 44. The pins 64, 66 may each be integrally formed with the corresponding locking plate 60, 62. The armature 54 may be connected to the locking plates 60, 62 each on one side of the axis of rotation. The locking plates 60, 62 may each include an engagement feature disposed on an opposite side of the axis of rotation. The engagement feature may be configured to engage the traverse member 42 to inhibit movement of the slide member 44 with respect to the traverse member 42. For instance, the engagement feature may be a protrusion 72, 74 as illustrated in FIGS. 9 and 10 that are configured to engage one or more slots or notches 76, 78 in the traverse member 42 or vice versa, thereby providing a plurality of locking positions. The locking plates 60, 62 may be made of any suitable material, such as a polymeric material.

Figure 4:
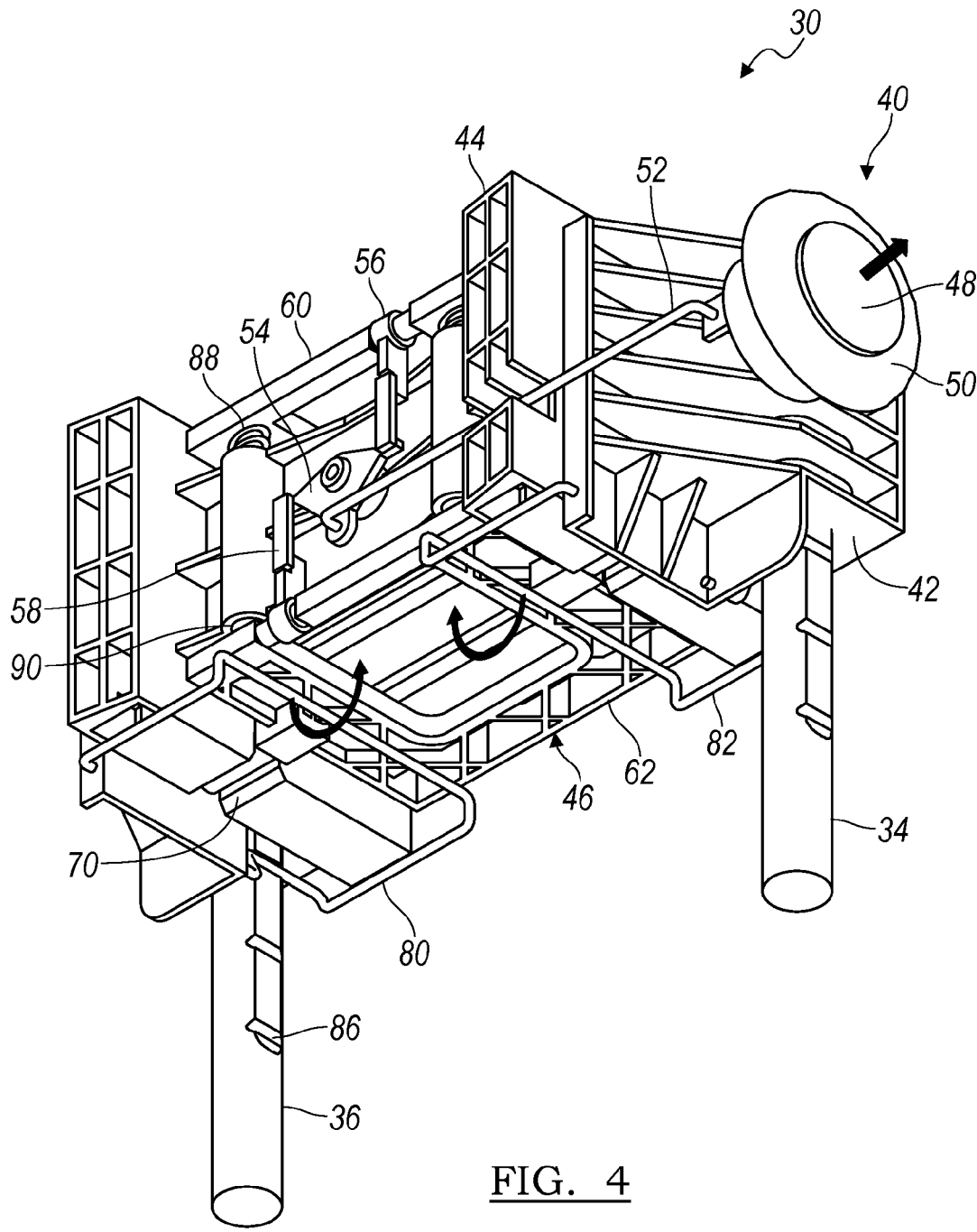
FIG. 4 is a fragmentary perspective view of the moveable head restraint of FIG. 1.
Figure 5:
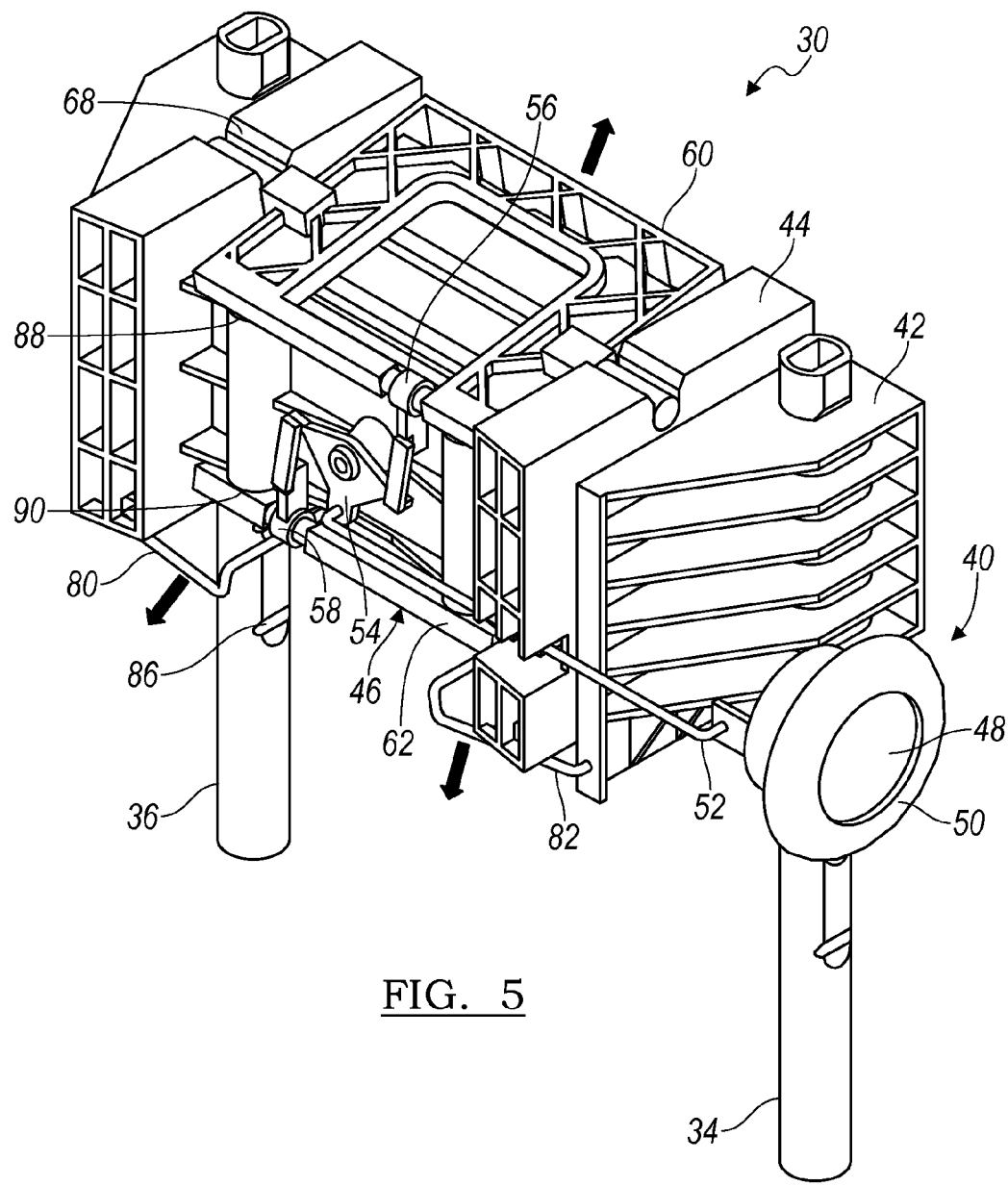
FIGS. 5 and 6 are fragmentary perspective views of a portion of the moveable head restraint in an unlocked condition.
Figure 6:
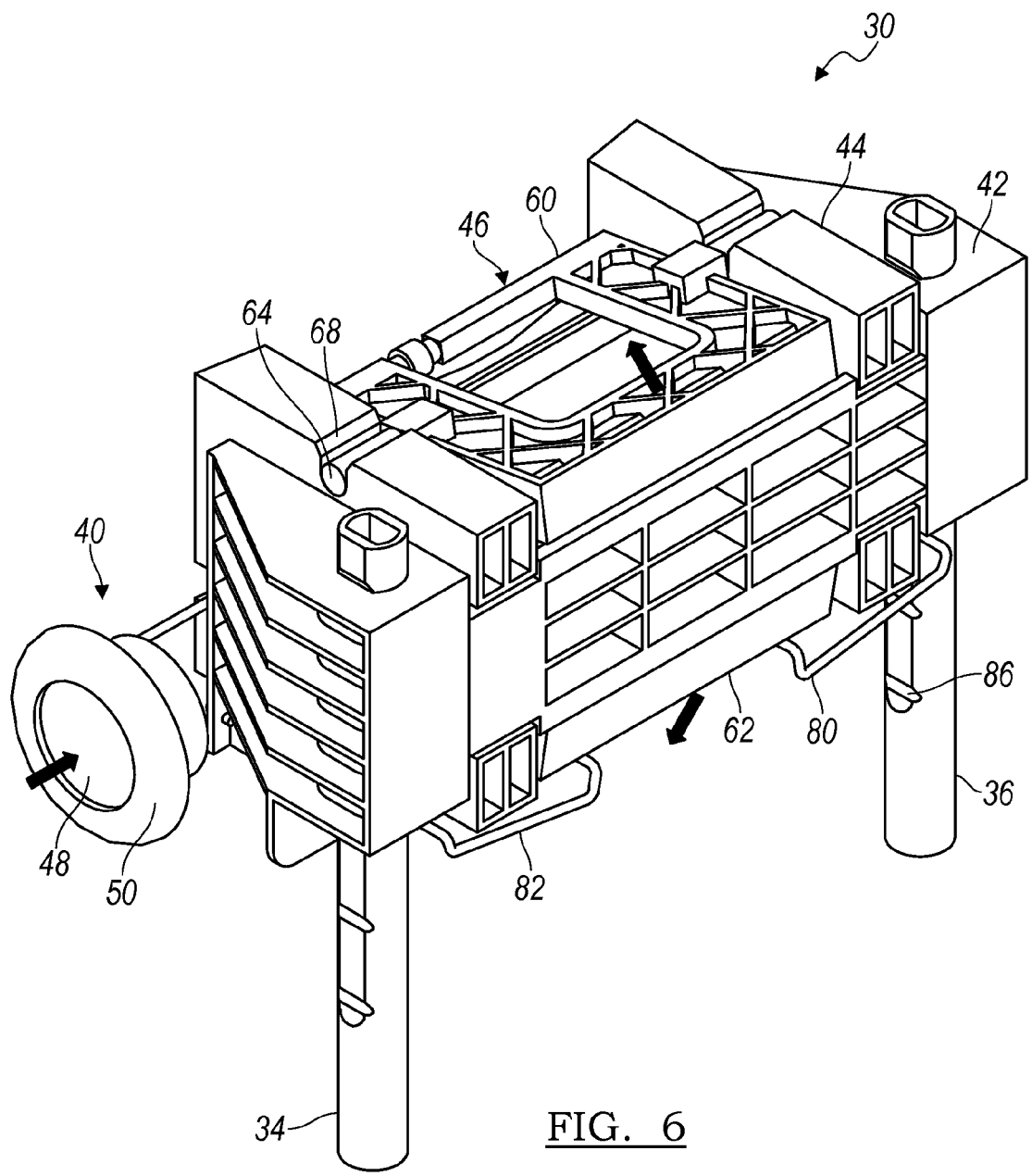
Figure 7:
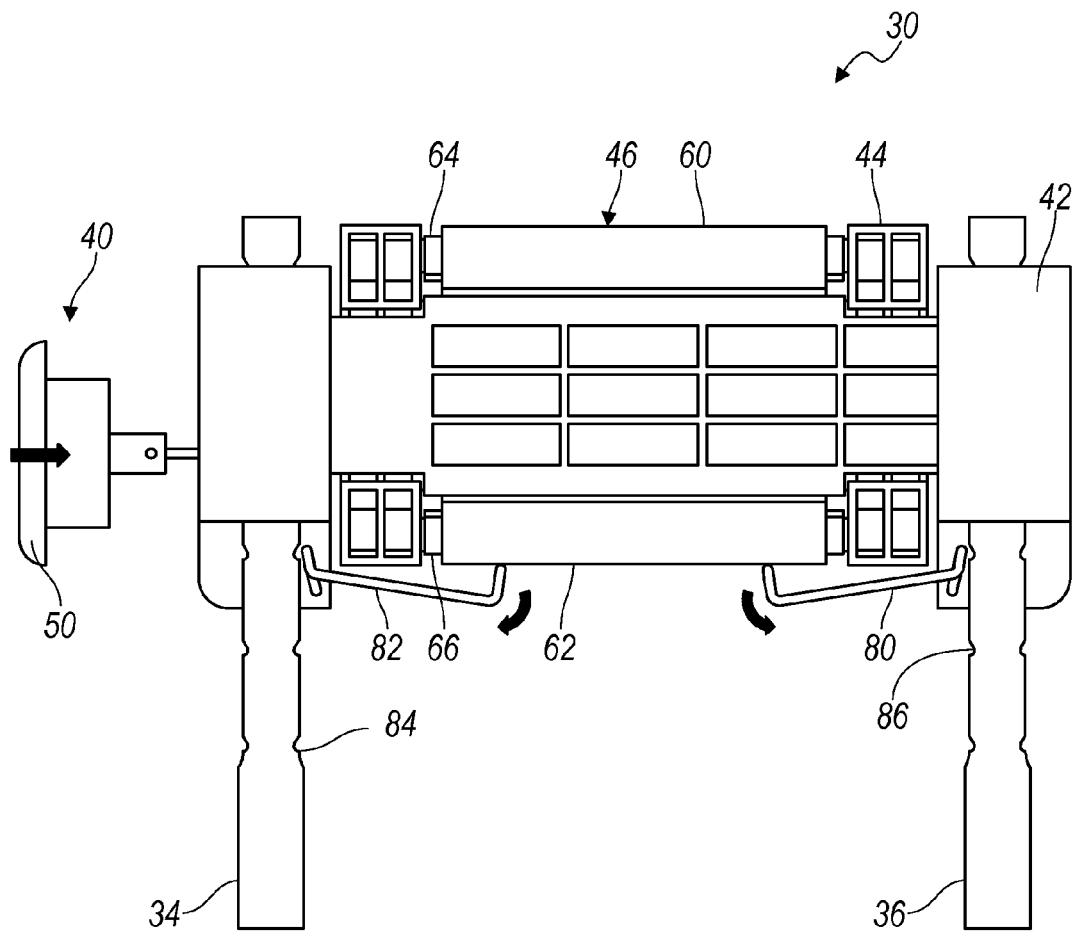
FIG. 7 is a back side view of the moveable head restraint shown in FIG. 5.
Figure 8:
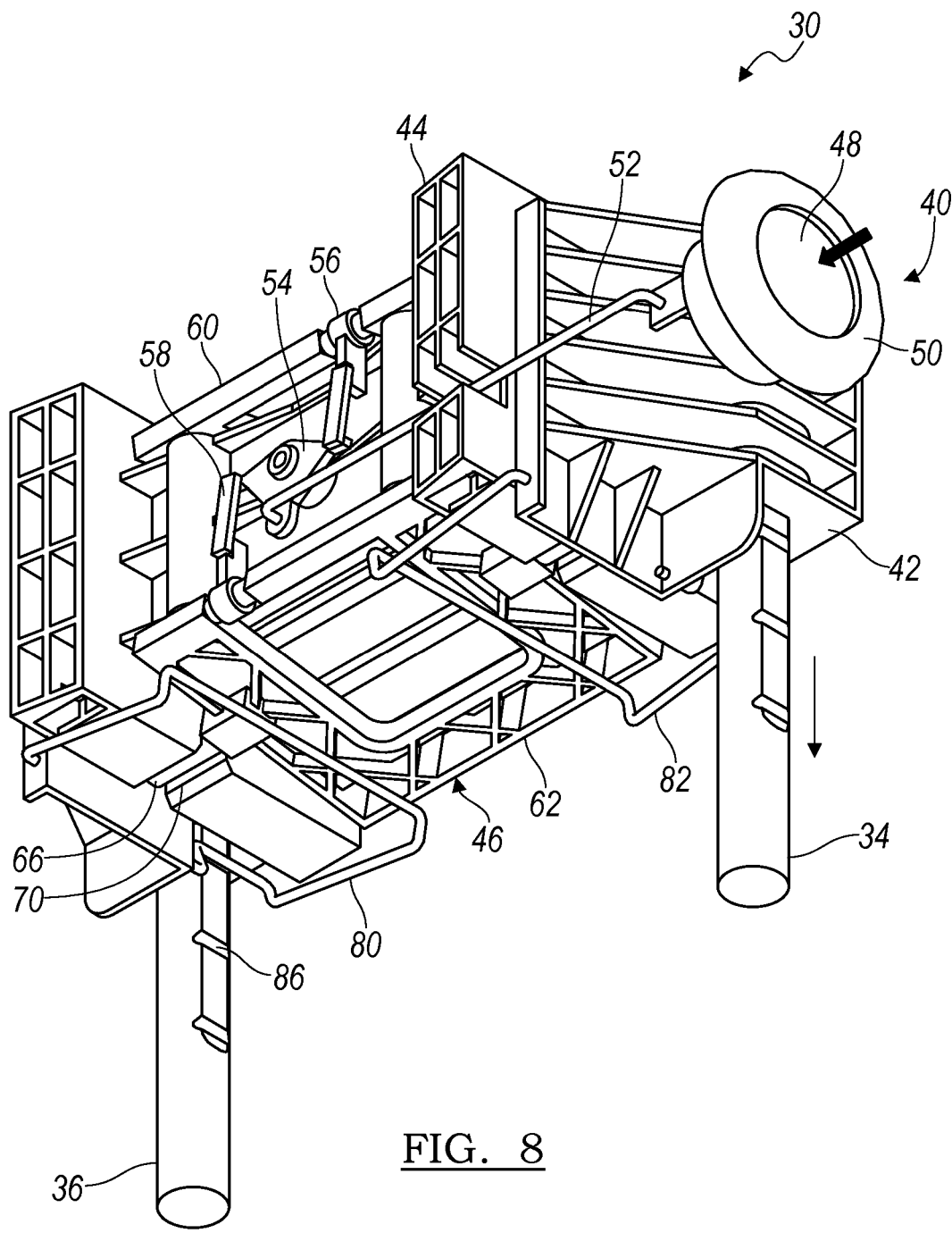
FIG. 8 is a fragmentary perspective view of the moveable head restraint of FIG. 5.

Movement of the lower locking plate 62 may actuate one or more support post locking features as is best shown in FIG. 6. The support post locking features may have any suitable configuration. In at least one embodiment, the support post locking features may be metal wires 80, 82. The support post locking features 80, 82 may be disposed on the traverse member 42 as is best shown in FIG. 8. The support post locking features 80, 82 may engage features such as notches 84, 86 and support posts 34, 36 to inhibit movement of the headrest 38 toward or away from the seat back 32 as is best shown in FIGS. 3 and 4 and may disengage features such as the notches 84, 86 in the support posts 34, 36 when actuated by the locking plate 62 as is best illustrated in FIG. 7. FIG. 7 shows three notches 84, 86 or grooves, but a greater or lesser number may be provided. In at least one embodiment, the notches 84, 86 or grooves may be equally spaced apart and may provide a range of travel of approximately forty millimeters.

One or more biasing members, such as coil springs 88, 90, may be provided to bias the locking plates 60, 62 and consequently the latching subsystem 46 toward a locked condition as illustrated in FIGS. 1-3. The biasing members 88, 90 may be disposed on or received by the slide member 44 and exert a biasing force on one or more of the locking plates 60, 62 as is best shown in FIG. 1.

The latching subsystem 46 may be manually actuated. Force exerted on the button 48 may overcome the biasing force exerted by the springs 88, 90 to actuate the link 52 and the armature 54. The armature 54 may then actuate the locking plates 60, 62 to disengage the traverse member 42 and actuate the secondary links 56, 58 to actuate the lower locking plate 62 to flex the metal spring wires 80, 82 to disengage from the support posts 34, 36 to permit the operator to move the headrest 38 in one or more directions. The unlocked position of the locking plates 60, 62 is illustrated in FIGS. 5-8 and 10.

The biasing force exerted by the springs 88, 90 may move the latching subsystem 46 from the unlocked condition toward a locked condition when sufficient force is not exerted on the button 48. For instance, release of the button 48 may allow the springs 88, 90 to move the locking plates 60, 62 to engage the traverse member 42 as illustrated in FIG. 9 and allow the metal wires 80, 82 to move to engage the support posts 34, 36 which may actuate the armature 54, input link 52 and button 48 back toward their initial positions.

Actuation of the button 48 may enable adjustment in multiple directions, such as "x" (fore and aft) and "z" (upright) directions that may be disposed along perpendicular axis or planes. Movement in one or more directions or manners may occur independently or simultaneously. Moreover, the head restraint assembly 30 may be configured such that forward and/or upward movement may occur without pressing the button 48 or actuating the latching subsystem 46 while locking is provided to inhibit movement in the opposite (backward and/or downward) direction(s). For example, referring to FIG. 3, the notches 84, 86 are inclined in an upward direction so that the latching subsystem 46 does not need to be unlocked for upward travel. Likewise, referring to FIG. 9, the notches 76, 78 are inclined in a backward direction so that the latching subsystem 46 does not need to be unlocked for travel in the aft direction.

The head restraint 38 may also provide a reduced back set to provide whiplash test results that are comparable to those of active head restraint systems and may help meet regulatory requirements.

The metal wire springs 80, 82 extend an appropriate distance beneath the lower locking plate 62 so that the lower locking plate 62 engages the metal spring wires 80, 82 and actuates them when the latching subsystem 46 is being unlocked regardless of the fore/aft position of the slide member 44 and consequently the lower locking plate 62 relative to the metal spring wires 80, 82.

Figure 11:
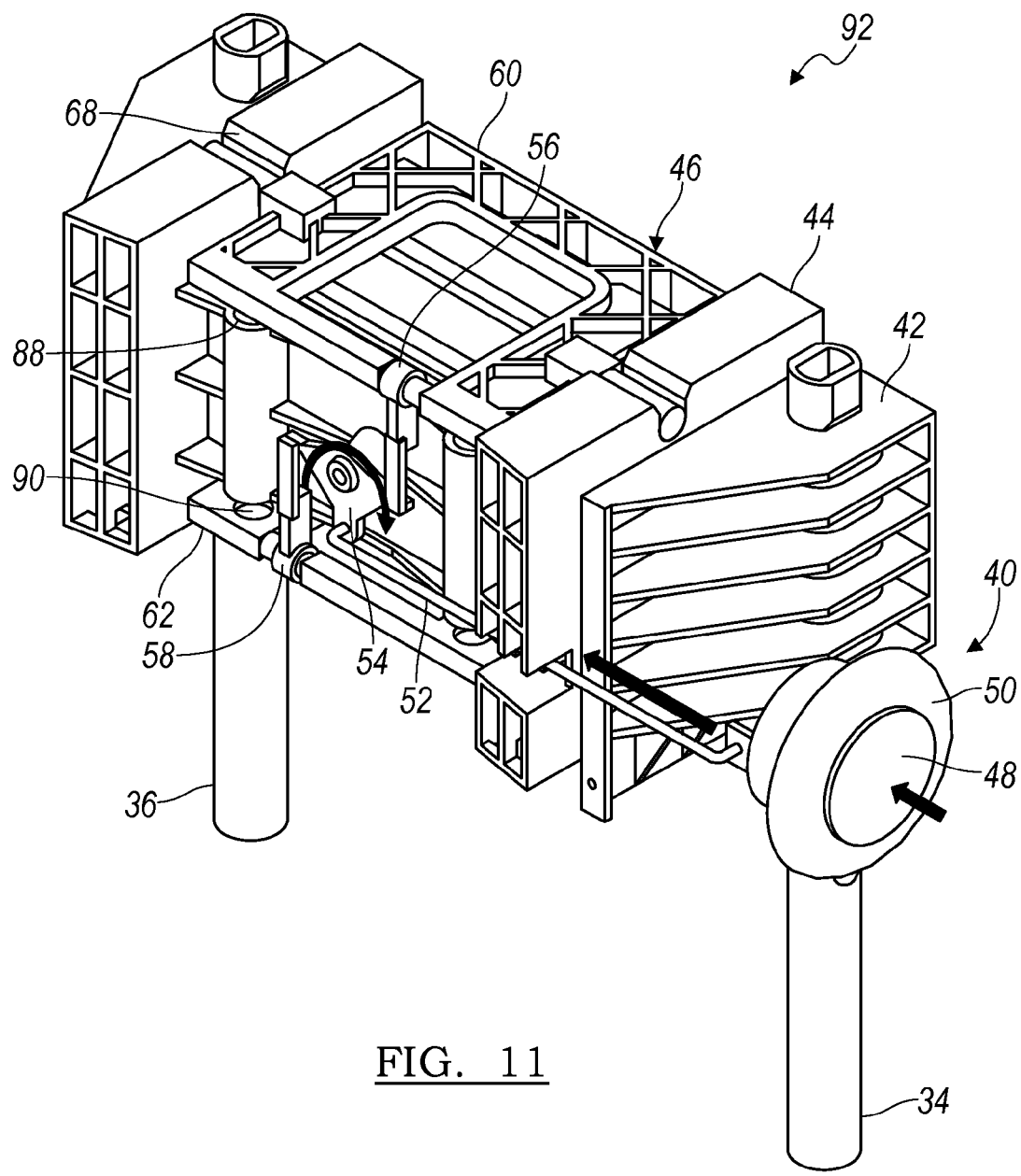
FIG. 11 is a fragmentary perspective view of a second embodiment of a moveable head restraint in a locked condition.
Figure 12:
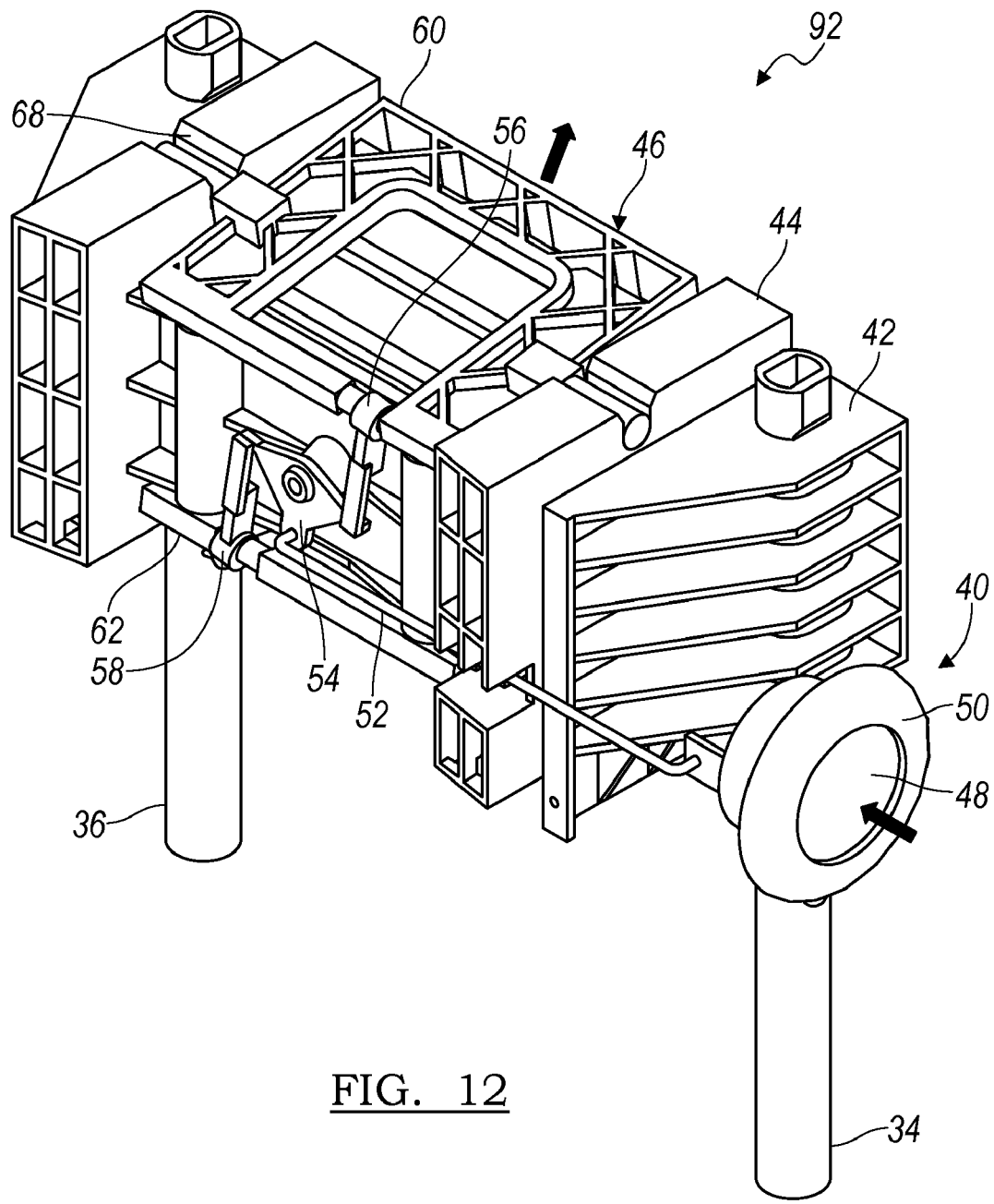
FIG. 12 is a fragmentary perspective view of the moveable head restraint in FIG. 11 in an unlocked condition.
Figures 13, 14:
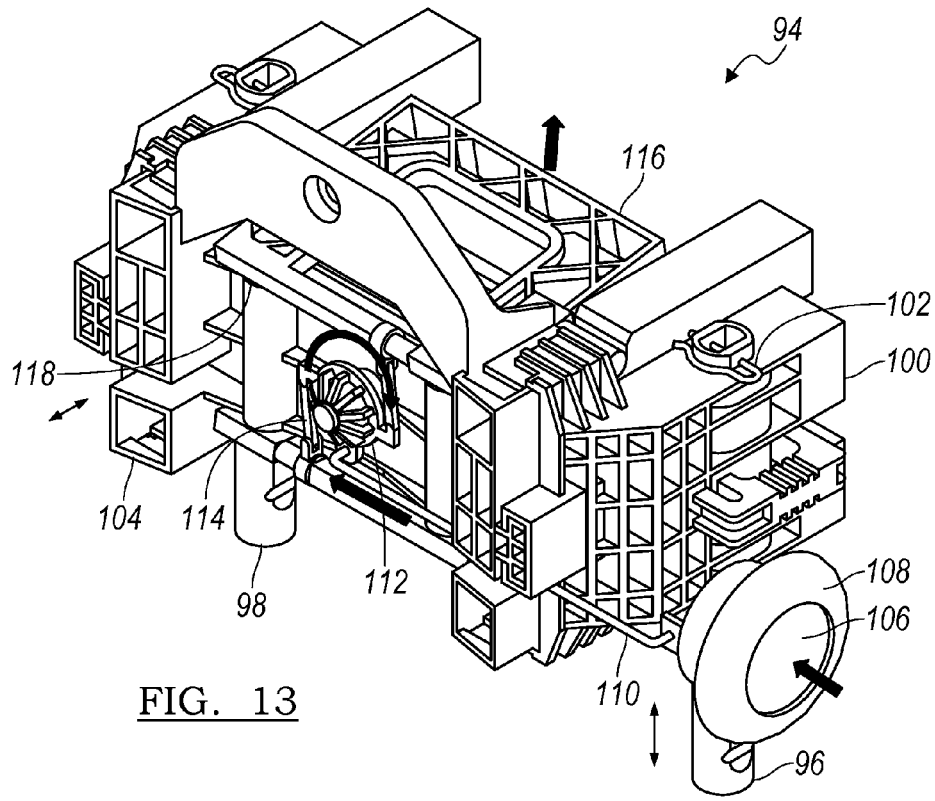
FIG. 13 is a fragmentary perspective view of another embodiment of a movable head restraint in an unlocked position.
FIG. 14 is a fragmentary rear perspective view of the movable head restraint assembly of FIG. 13, illustrated in the unlocked position.
Figure 15:
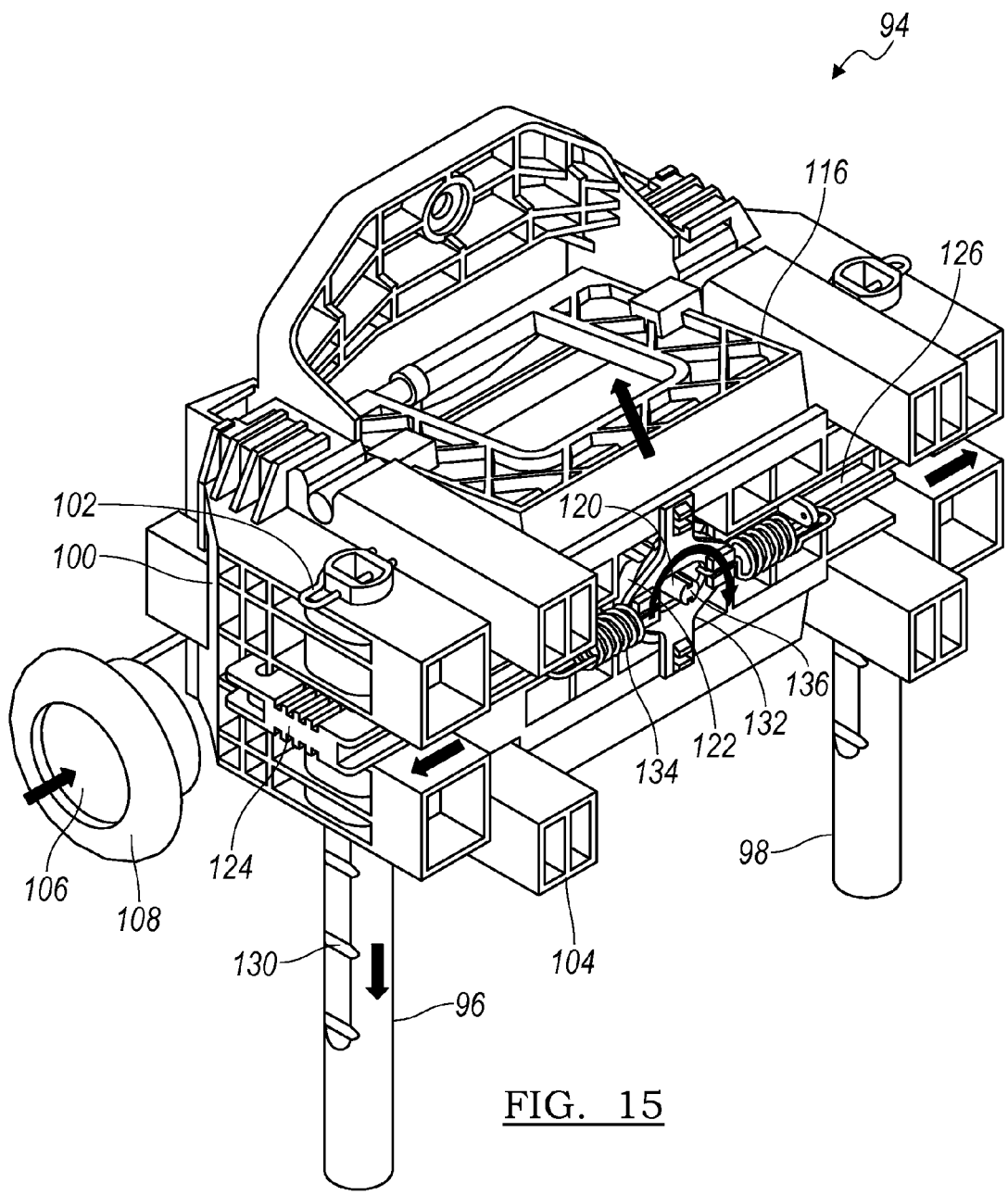
FIG. 15 is another rear perspective view of the movable head restraint assembly of FIG. 13, illustrated in the unlocked position.
Figure 16:
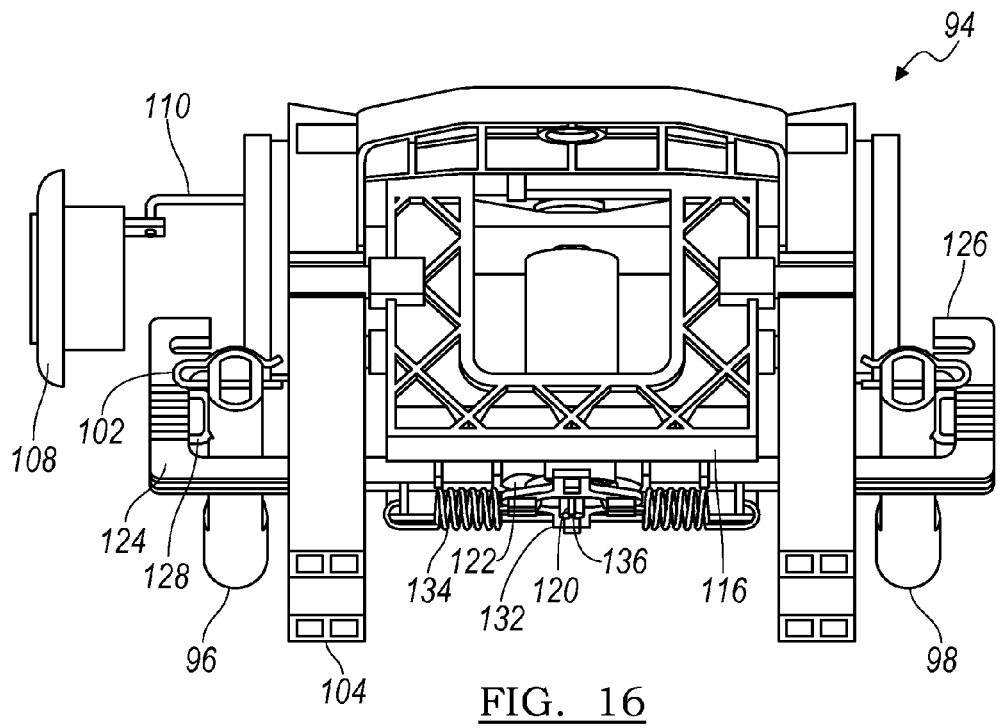
FIG. 16 is a top perspective view of the movable head restraint assembly of FIG. 13, illustrated in a locked position.
Figure 17:
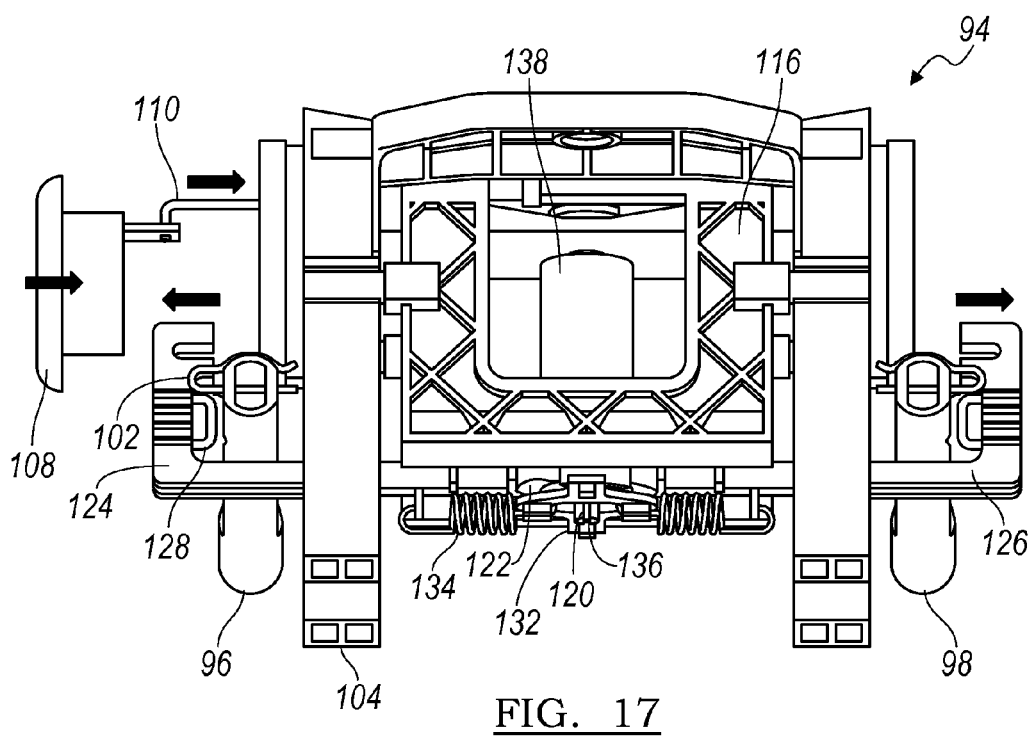
FIG. 17 is another top perspective view of the movable head restraint assembly of FIG. 13, illustrated in the unlocked position.

In another embodiment illustrated in FIGS. 11 and 12, the support post locking features 80, 82 may be deleted as well as the notches 84, 86 on the support posts 34, 36. Movement of the headrest 38 toward or away from the seat back 32 may be facilitated by guide sleeves in the seat back 32 that receive the support posts 34, 36. For instance, the guide sleeves may receive the support posts 34, 36 and may be configured to consecutively permit movement of the support posts 34, 36 with respect to the guide sleeves. The remaining components of the latching subsystem 46 are identical to the prior embodiment for permitting adjustment in the fore/aft direction.

FIGS. 13-17 illustrate a movable head restraint assembly 94 according to another embodiment. The head restraint assembly 94 includes a pair of support posts 96, 98. A traverse member 100 is mounted upon the support posts 96, 98 for translation along the posts 96, 98. Clevis pins 102 may be provided at upper ends of the support posts 96, 98 for limiting upward travel of the traverse member 100 along the support posts 96, 98. A slide member 104 is mounted to the traverse member 100 for translation of the fore/aft direction relative to the traverse member 100.

A push button 106 is provided in a sleeve 108 for actuating a link 110. The link 110 is connected to a rotary actuator 112 at a radially offset position. The rotary actuator 112 is mounted for rotation upon the slide member 104. Likewise, the push button 106 and sleeve 108 may also be fixed to the slide member 104 via a shell (not shown) that is mounted upon the slide member 104 and provides a mounting aperture for the sleeve 108. The rotary actuator 112 includes a pair of output links 114 that are each pivotally connected to a locking plate 116. Similar to the prior embodiments, manual actuation of the push button 106 actuates the link 110 thereby rotating the rotary actuator 112 and translating the output links 114 and pivoting the locking plates 116 out of engagement with notches in the traverse member 100. Coil springs 118 are retained between the locking plates 116 and the slide member 104 for maintaining engagement of the locking plates 116 with the notches of the traverse member 100.

The rotary actuator 112 is connected for rotation with a shaft 120 that extends from a rear end of the slide member 104. The shaft 120 is connected to a cam 122 that is fixed for rotation on the traverse member 100. A pair of locking arms 124, 126 are each mounted to the traverse member and are retained for translation in a lateral direction as illustrated by the arrow in FIGS. 14, 15 and 17. Each of the locking arms 124, 126 includes an inboard projection 128 for engaging one of a series of notches 130 formed along the support posts 96, 98. Thus, when the push button 106 is actuated, thereby driving the rotary actuator 112, the shaft 120 rotates the cam 122 thereby pushing the locking arms 124, 126 laterally outboard to disengage the projection 128 from the notches 130 for permitting movement in an upright direction of the support posts 96, 98.

A bracket 132 is mounted on the traverse member 100 and is utilized for interconnecting a pair of extension springs 134 to the traverse member 100 and one of the locking arms 124, 126. The extension springs 134 urge the locking arms 124, 126 laterally inboard for maintaining the projections 128 in the locked position of the notches 130. In absence of a manual force upon the push button 106, the extension springs 134 urge the locking arms 124, 126 against the cam 122 causing the shaft 120 and the rotary actuator 112 to rotate. Additionally, the coil springs 118 urge the locking plates 116 to pivot thereby translating the output links 114 for rotating the rotary actuator 112 for returning the locking plates 116 and the locking arms 124, 126 to the locked position illustrated in FIG. 16.

An output end 136 of the shaft 120 includes an external spline, and the cam 122 includes an internal spline such that rotation of the shaft 120 rotates the cam 122. The spline output end 136 permits the shaft 120 to translate linearly relative to the cam 122. Thus, as the slide member 104 is translated relative to the traverse member 100, the shaft 120 remains connected for rotation with the cam 122 at a various positions in the fore/aft direction.

As in the prior embodiment, the notches 130 and the support posts 96, 98 may be inclined upward for permitting upward travel of the traverse member 100 without manual actuation of the locking arms 124, 126. Likewise the engagement of the locking plates 116 with the traverse member 100 may be inclined in a forward direction, the opposite of FIGS. 9 and 10, for permitting translation of the slide member 104 in the forward direction without manual actuation of the locking plates 116. In order to prevent the disengagement of the locking arms 124, 126 from the notches 130 from consequently rotating the rotary actuator 112, a compliance device may be provided between the rotary actuator 112 and the shaft 120 for permitting torque from the rotary actuator 112 to be imparted to the cam 122, without permitting torque from the cam 122 from being imparted to the rotary actuator 112. The compliance device may be that the follower ends of the locking arms 124, 126 are not fixed to the cam 122. If so, an additional compliance device 138 may be provided for prevent torque from being transmitted from the shaft 120 to the rotary actuator.

Alternatively, the latching subsystem 46 may be unlocked automatically. A motor 138 may be provided for rotating the rotary actuator 112 and the shaft 120 for unlocking the head restraint assembly 94 for manual adjustment, or for returning the head restraint assembly 94 to a reset position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed is:

1. An adjustable head restraint assembly comprising:
a support rod adapted to be mounted proximate to a vehicle seat back;
a primary frame supported upon the support rod;
a secondary frame mounted to the primary frame for translation in a fore and aft direction of the vehicle seat back;
a head restraint supported by the secondary frame;
a locking arm pivotally connected to one of the primary frame and the secondary frame for engagement with the other of the primary frame and the secondary frame, wherein the other of the primary frame and the secondary frame has a series of notches formed therein spaced incrementally in the fore and aft direction, and wherein the arm is sized to be received within one of the series of notches;
a biasing member cooperating with the locking arm and the one of the primary frame and the secondary frame, for biasing the locking arm into a locked position thereby locking the secondary frame relative to the primary frame; and
an actuator for pivoting the locking arm out of engagement from the series of notches for unlocking the locking arm and permitting adjustment of the head restraint in the fore and aft direction.

2. The adjustable head restraint assembly of claim 1 wherein the actuator comprises:

a push button supported for translation by one of the primary frame and the secondary frame for receiving a manual input force;

an input link connected to the push button;

a rotary actuator connected for rotation to one of the primary frame and the secondary frame, the rotary actuator having a radially offset connection with the input link such that translation of the push button actuates the input link and rotates the rotary actuator; and an output link pivotally connected to the rotary actuator radially offset from center and pivotally connected to the locking arm such that rotation of the rotary actuator actuates the output link and pivots the locking arm out of engagement from the series of notches.

3. The adjustable head restraint assembly of claim 2 wherein the locking arm is further defined as a first locking arm;

wherein the biasing member is further defined as a first biasing member;

wherein the support rod is oriented generally upright and has a series of notches formed therein spaced incrementally in an upright direction of the seat back; and wherein the adjustable head restraint assembly further comprises:

a second locking arm operably connected to the primary frame for engagement with the support rod, and wherein the second locking arm is sized to be received within one of the series of notches in the support rod, a second biasing member cooperating with the second locking arm and the primary frame, for urging the second locking arm into a locked position thereby locking the primary frame relative to the support rod, and a cam driven by the rotary actuator and operably connected to the second locking arm to actuate the second locking arm out of engagement from the series of notches in the support rod.

4. The adjustable head restraint assembly of claim 3 wherein the rotary actuator is mounted to the secondary frame;

wherein the cam is mounted to the primary frame and includes an internal spline; and wherein the adjustable head restraint assembly further comprises a shaft driven by the rotary actuator, the shaft having an external spline received within the internal spline of the cam for maintaining rotary engagement of the rotary actuator and the cam as the secondary frame is translated relative to the primary frame.

5. The adjustable head restraint assembly of claim 4 wherein the series of notches formed in the support rod are inclined in an upward direction to permit upward adjustment of the primary frame without manual actuation of the actuator; and wherein the adjustable head restraint assembly further comprises a compliance device connecting the shaft to the rotary actuator so that upward adjustment of the primary frame without manual actuation of the actuator does not disengage the first locking arm from the series of notches in the other of the primary frame and the secondary frame.

6. The adjustable head restraint assembly of claim 2 wherein the series of notches formed in the other of the primary frame and the secondary frame include a pair of series of notches formed in spaced opposition;

wherein the locking arm comprises a pair of locking arms each pivotally connected to the one of the primary frame and the secondary frame for engagement with one of the pair of series of notches;

wherein the biasing member comprises a pair of biasing members each cooperating with one of the pair of locking arms; and wherein the output link comprises a pair of output links each pivotally connected to the rotary actuator radially offset from center and pivotally connected to one of the pair of locking arms such that rotation of the rotary actuator actuates the pair of output links and pivots the pair of locking arms out of engagement from the pair of series of notches.

7. The adjustable head restraint assembly of claim 1 wherein the locking arm is further defined as a first locking arm;

wherein the biasing member is further defined as a first biasing member;

wherein the support rod is oriented generally upright and has a series of notches formed therein spaced incrementally in an upright direction of the seat back; and wherein the adjustable head restraint assembly further comprises:

a second locking arm operably connected to the primary frame for engagement with the support rod, and wherein the second locking arm is sized to be received within one of the series of notches in the support rod, a second biasing member cooperating with the second locking arm and the primary frame, for urging the second locking arm into a locked position thereby locking the primary frame relative to the support rod.

8. The adjustable head restraint assembly of claim 7 wherein the first locking arm is operably connected to the second locking arm such that actuation of the first locking arm to disengage from the series of notches in the other of the primary frame and the secondary frame actuates the second locking arm to disengage from the series of notches in the support rod.

9. The adjustable head restraint assembly of claim 7 wherein the second biasing member further comprises a wire spring connected to the primary frame.

10. The adjustable head restraint assembly of claim 9 wherein the wire spring extends into engagement with the series of notches in the support rod thereby defining the second locking arm.

11. The adjustable head restraint assembly of claim 10 wherein the support rod comprises a pair of support rods each oriented generally upright and each having a series of notches formed therein spaced incrementally in the upright direction; and wherein the wire spring comprises a pair of wire springs each connected to the primary frame for extending into engagement with the series of notches in one of the pair of support rods.

12. The adjustable head restraint assembly of claim 7 further comprising a cam driven by the actuator and operably connected to the second locking arm to actuate the second locking arm out of engagement from the series of notches in the support rod.

13. The adjustable head restraint assembly of claim 12 wherein the second locking arm is mounted for translation to the primary frame.

14. The adjustable head restraint assembly of claim 13 wherein the second biasing member comprises a tension spring mounted to the primary frame and the second locking arm.

15. The adjustable head restraint assembly of claim 12 wherein the support rod comprises a pair of support rods each oriented generally upright and each having a series of notches formed therein spaced incrementally in the upright direction; and wherein the second locking arm comprises a pair of locking arms each in engagement with the series of notches of one of the support rods and each cooperating with the cam.

16. The adjustable head restraint assembly of claim 15 wherein the pair of second locking arms are each mounted for translation in opposed lateral directions to the primary frame.

17. The adjustable head restraint assembly of claim 16 wherein the second biasing member comprises a pair of tension springs, each mounted to the primary frame and to one of the second locking arms for maintaining the pair of second locking arms in engagement with the series of notches in the support rods.

18. A vehicle seat assembly comprising:
a seat back;
an adjustable head restraint assembly according to claim 1;
a cushion provided on the head restraint; and
a trim cover provided on the cushion.

19. An adjustable head restraint assembly comprising:
a support rod adapted to be mounted proximate to a vehicle seat back, the support rod being oriented generally upright and having a series of notches formed therein spaced incrementally in an upright direction of the seat back;
a primary frame supported upon the support rod for translation in the upright direction;
a first locking arm operably connected to the primary frame for engagement with one of the series of notches in the support rod;
a first biasing member cooperating with the first locking arm for biasing the first locking arm into a locked position thereby locking the primary frame relative to the support rod;
a secondary frame mounted to the primary frame for translation in a fore and aft direction of the vehicle seat back;
a head restraint supported on the secondary frame;
a second locking arm operably connected to one of the primary frame and the secondary frame for engagement with the other of the primary frame and the secondary frame, wherein the other of the primary frame and the secondary frame has a series of notches formed therein and spaced incrementally in the fore and aft direction, and wherein the arm is sized to be received within one of the series of notches;
a second biasing member cooperating with the second locking arm and the one of the primary frame and the secondary frame, for biasing the second locking arm into a locked position thereby locking the secondary frame relative to the primary frame; and
an actuator for disengaging the first locking arm from the series of notches of the support rod and for disengaging the second locking arm from the series of notches of the other of the primary frame and the secondary frame, for unlocking the first and second locking arms and permitting adjustment of the head restraint in the fore and aft direction and the upright direction.

20. An adjustable head restraint assembly comprising:
a support rod adapted to be mounted proximate to a vehicle seat back, the support rod being oriented generally upright and having a series of notches formed therein spaced incrementally in an upright direction of the seat back;
a primary frame supported upon the support rod for translation in the upright direction;
a first locking arm operably connected to the primary frame for engagement with one of the series of notches in the support rod;
a first biasing member cooperating with the first locking arm for biasing the first locking arm into a locked position thereby locking the primary frame relative to the support rod;
a secondary frame mounted to the primary frame for translation in a fore and aft direction of the vehicle seat back;
a head restraint supported upon the secondary frame;
a second locking arm operably connected to one of the primary frame and the secondary frame for engagement with the other of the primary frame and the secondary frame, wherein the other of the primary frame and the secondary frame has a series of notches formed therein spaced incrementally in the fore and aft direction, and wherein the arm is sized to be received within one of the series of notches;
a second biasing member cooperating with the second locking arm and the one of the primary frame and the secondary frame, for urging the second locking arm into a locked position thereby locking the secondary frame relative to the primary frame;
a linear actuator supported by one of the primary frame and the secondary frame for receiving a manual input force; and
a rotary actuator supported by the secondary frame for converting the input force to rotation for disengaging the first locking arm from the series of notches of the support rod and for disengaging the second locking arm from the series of notches of the other of the primary frame and the secondary frame for unlocking the first and second locking arms and permitting adjustment of the head restraint in the fore and aft direction and the upright direction.

* * * * *